US012800408B2

(12) United States Patent
Ishizaki et al.

(10) Patent No.: US 12,800,408 B2
(45) Date of Patent: Nov. 17, 2026

(54) ELECTROSTATIC CAPACITY SENSOR

(71) Applicants: HONDA MOTOR CO., LTD., Tokyo (JP); The University of British Columbia, Vancouver (CA)

(72) Inventors: Ryusuke Ishizaki, Wako (JP); Fumiya Hamatsu, Wako (JP); John D.W. Madden, Vancouver (CA); Mirza Saquib Sarwar, Vancouver (CA); Kieran Morton, Vancouver (CA); Bertille Dupont, Vancouver (CA); Austin Weir, Vancouver (CA)

(73) Assignees: Honda Motor Co., Ltd., Tokyo (JP); The University of British Columbia, Vancouver (CA)

( * ) Notice: Subject to any disclaimer, the term of this patent is extended or adjusted under 35 U.S.C. 154(b) by 304 days.

(21) Appl. No.: 18/203,715

(22) Filed: May 31, 2023

(65) Prior Publication Data

US 2023/0408348 A1 Dec. 21, 2023

(30) Foreign Application Priority Data

Jun. 15, 2022 (JP) ................................ 2022-096487

(51) Int. Cl.
*G01L 1/14* (2006.01)
*G01L 1/20* (2006.01)
*G01L 5/24* (2006.01)

(52) U.S. Cl.
CPC .............. *G01L 1/146* (2013.01); *G01L 1/205* (2013.01); *G01L 1/142* (2013.01); *G01L 5/24* (2013.01)

(58) Field of Classification Search
CPC ......... G01L 1/146; G01L 1/205; G01L 1/142; G01L 5/24
See application file for complete search history.

(56) References Cited

U.S. PATENT DOCUMENTS 3,621,377 A * 11/1971 James ..................... H02M 3/18 361/279
5,747,698 A * 5/1998 Spillman, Jr ............ G01B 7/22 73/776

(Continued)

FOREIGN PATENT DOCUMENTS

JP 2011-075322 A 4/2011
JP 2011-237288 A 11/2011

(Continued)

OTHER PUBLICATIONS

Office Action dated Apr. 30, 2025 issued in the corresponding Japanese Patent Application No. 2022-096487 with the English translation thereof.

(Continued)

*Primary Examiner* — Jonathan M Dunlap
(74) *Attorney, Agent, or Firm* — Carrier, Shende & Associates P.C.; Joseph P. Carrier; Jeffrey T. Gedeon

(57) ABSTRACT

An electrostatic capacity sensor 1 capable of expanding a force detectable region includes an upper electrode 11, a lower electrode 11 for detecting electrostatic capacity C between the lower electrode 11 and the upper electrode 11, and a base material 12 having dielectric properties and elasticity and disposed between upper and lower electrodes 11 and 11. An upper base material layer portion 12*a* and a lower base material layer portion 12*b* of the base material 12 are configured such that elastic deformation amounts when the same force is applied are different from each other.

3 Claims, 18 Drawing Sheets

(56) References Cited

U.S. PATENT DOCUMENTS

| | | | | |
|---|---|---|---|---|
| 8,120,588 | B2 * | 2/2012 | Klinghult | H01H 13/803<br>345/169 |
| 9,645,019 | B2 * | 5/2017 | Duchaine | G01D 5/2417 |
| 9,904,395 | B2 | 2/2018 | Ogura et al. | |
| 10,113,925 | B2 * | 10/2018 | Lai | G01L 1/14 |
| 11,592,946 | B1 * | 2/2023 | Bechstein | G01L 1/142 |
| 11,982,580 | B2 * | 5/2024 | Topper | G01L 1/146 |
| 12,345,591 | B2 * | 7/2025 | Sakakura | G01L 5/165 |
| 2006/0196702 | A1 | 9/2006 | Hansen et al. | |
| 2010/0282000 | A1 * | 11/2010 | Gorjanc | G01L 1/146<br>73/862.046 |
| 2019/0234814 | A1 * | 8/2019 | Yoon | H01B 3/30 |
| 2021/0041310 | A1 * | 2/2021 | Töpper | H10N 30/206 |
| 2021/0278300 | A1 * | 9/2021 | Bao | B25J 19/02 |
| 2022/0042866 | A1 * | 2/2022 | Mori | B60C 23/064 |

FOREIGN PATENT DOCUMENTS

| | | | |
|---|---|---|---|
| JP | 2012-007988 | A | 1/2012 |
| JP | 2012-013458 | A | 1/2012 |
| JP | 2016-183956 | A | 10/2016 |
| JP | 2019-090729 | A | 6/2019 |
| JP | 2019-124506 | A | 7/2019 |

OTHER PUBLICATIONS

Office Action dated Sep. 24, 2025 issued in the corresponding Japanese Patent Application No. 2022-096487 with the English translation thereof.

* cited by examiner

ELECTROSTATIC CAPACITY SENSOR

BACKGROUND

Technical Field

The present invention relates to an electrostatic capacity sensor for detecting a force.

Related Art

Conventionally, an electrostatic capacity sensor described in JP 2019-90729 A is known. The electrostatic capacity sensor is for pressure detection, and includes a flexible substrate with flexibility, a hard substrate, and the like. A movable electrode including a first movable electrode and a second movable electrode, and a signal line connected to the movable electrode are attached to a lower surface of the flexible substrate.

In the case of this electrostatic capacity sensor, when a pressure acts on an upper portion of the movable electrode in the flexible substrate, the movable electrode moves to a fixed electrode side, and electrostatic capacity changes as a distance between the electrodes changes, whereby the pressure is detected.

SUMMARY

In recent years, an industrial machine such as a robot is desired to have a wide force detectable range as an electrostatic capacity sensor. Meanwhile, according to the conventional electrostatic capacity sensor, there is a problem that the force detectable region is narrowed due to a space between a movable electrode and a fixed electrode.

The present invention has been made to solve the above problems, and an object of the present invention is to provide an electrostatic capacity sensor capable of expanding a force detectable region.

According to a first aspect of the present invention, there is provided an electrostatic capacity sensor including: a first electrode; a second electrode disposed to face the first electrode and configured to detect electrostatic capacity between the second electrode and the first electrode; and a base material having dielectric properties and elasticity and disposed between the first electrode and the second electrode in a state of being in contact with the first electrode and the second electrode, in which the base material includes a plurality of base material layers provided to be arranged in a facing direction of the first electrode and the second electrode, and the plurality of base material layers are configured such that elastic deformation amounts when the same force is applied are different from each other.

According to this electrostatic capacity sensor, the base material having the dielectric properties and elasticity is disposed between the first electrode and the second electrode in a state of being in contact with the first electrode and the second electrode. The base material includes the plurality of base material layers provided to be arranged in the facing direction of the first electrode and the second electrode, and the plurality of base material layers are configured such that the elastic deformation amounts when the same force is applied are different from each other.

As a result, when a force that reduces a distance between the two electrodes acts on one of the first electrode and the second electrode, the base material is elastically deformed in a state where the elastic deformation amount in each of the plurality of base material layers is different. As a result, a force in a small region can be detected by the elastic deformation of the base material layer that is more likely to be elastically deformed with respect to the same force, and a force in a large region can be detected by the elastic deformation of the base material layer that is less likely to be elastically deformed with respect to the same force. As a result, a force detectable region can be enlarged.

In the first aspect of the present invention, preferably, each of the first electrode and the second electrode is provided on an electrode substrate having dielectric properties and elasticity.

According to this electrostatic capacity sensor, since each of the first electrode and the second electrode is provided on the electrode substrate having dielectric properties and elasticity, both the first electrode and the second electrode can be arranged on a side on which a force acts.

According to a second aspect of the present invention, there is provided an electrostatic capacity sensor including: a pair of first electrodes facing each other; a pair of second electrodes facing each other; a first base material having dielectric properties and elasticity and disposed between the pair of first electrodes in a state of being in contact with the pair of first electrodes; a second base material having dielectric properties and elasticity and disposed between the pair of second electrodes in a state of being in contact with the pair of second electrodes; and a common electrode substrate having dielectric properties and elasticity and provided with one of the pair of first electrodes and one of the pair of second electrodes, in which the first base material and the second base material are configured to have different elastic deformation amounts when the same force is applied.

According to this electrostatic capacity sensor, the first base material is disposed between the pair of first electrodes, the second base material is disposed between the pair of second electrodes, and one of the pair of first electrodes and one of the pair of second electrodes are provided on the common electrode substrate. The first base material and the second base material are configured such that the elastic deformation amounts when the same force is applied are different from each other. As a result, a change degree in electrostatic capacity between the pair of first electrodes and a change degree in electrostatic capacity between the pair of second electrodes when the same force is applied can be freely set, whereby the force detectable region can be enlarged. For the same reason, a degree of freedom in the arrangement of the pair of first electrodes and the pair of second electrodes can be improved, and a degree of freedom in design of the electrostatic capacity sensor can be improved. Furthermore, since one of the pair of first electrodes and one of the pair of second electrodes are provided on the same common electrode substrate, manufacturing cost can be reduced as compared with a case where one of the first electrodes and one of the second electrodes are provided on separate electrode substrates.

In the second aspect of the present invention, preferably, each of the other of the pair of first electrodes and the other of the pair of second electrodes is provided on another electrode substrate having dielectric properties and elasticity.

According to this electrostatic capacity sensor, since the other of the pair of first electrodes and the other of the pair of second electrodes are provided on another electrode substrate having dielectric properties and elasticity, both the other first electrode and the other second electrode can be arranged on a side on which a force acts.

DETAILED DESCRIPTION

Hereinafter, an electrostatic capacity sensor according to a first embodiment of the present invention will be described with reference to the drawings. An electrostatic capacity sensor 1 illustrated in FIG. 1 of the present embodiment is connected to a force detection device 40 via an electric wire (not illustrated). As will be described later, the force detection device 40 detects a force (load) acting on the electrostatic capacity sensor 1 on the basis of a detection result of electrostatic capacity C by the electrostatic capacity sensor 1.

Figure 1:
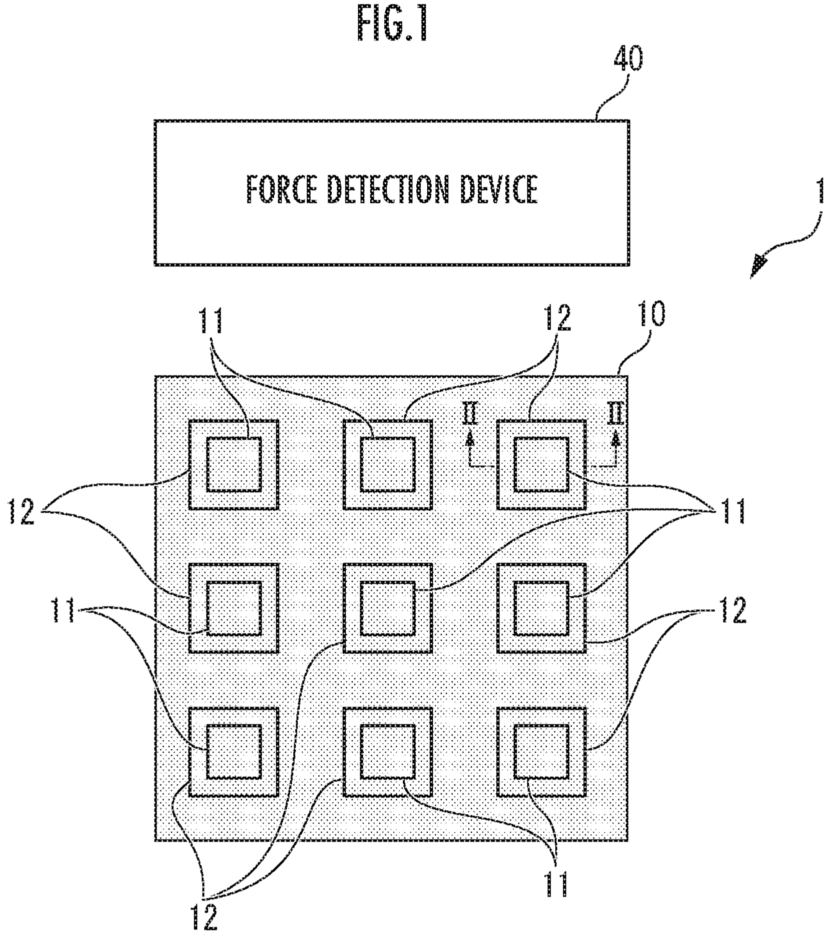
FIG. 1 is a plan view illustrating a configuration of an electrostatic capacity sensor according to a first embodiment of the present invention.
Figure 2:
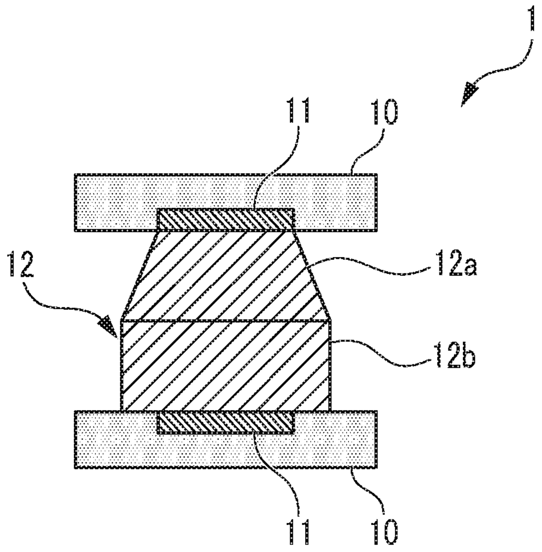
FIG. 2 is a view illustrating a cross section taken along line II-II in FIG. 1.

As illustrated in FIGS. 1 and 2, the electrostatic capacity sensor 1 of the present embodiment includes upper and lower electrode substrates 10 and 10, a plurality of sets (only one set is illustrated in FIG. 2) of electrodes 11 and 11 each including a pair of upper and lower electrodes 11 and 11 as one set, a plurality of (only nine are illustrated in FIG. 1) base materials 12, and the like.

Note that, in the following description, for convenience, a left side of FIG. 1 is referred to as "left", a right side of FIG. 1 is referred to as "right", a lower side of FIG. 1 is referred to as "front", an upper side of FIG. 1 is referred to as "rear", a front side of FIG. 1 is referred to as "upper", and a back side of FIG. 1 is referred to as "lower".

The upper and lower electrode substrates 10 and 10 are plate-shaped, and are made of a material (for example, silicone rubber) having dielectric properties and elasticity (or flexibility). The upper and lower electrode substrates 10 and 10 may be composed of elastomers including those based on poly(styrene-block-isobutylene-block-styrene), styrene-ethylene-butylene-styrene polymers, and other elastomers from the styrene-isobutadiene family, as well as polyurethane elastomers. The upper and lower electrode substrates 10 and 10 may also be composed of materials in the form of foams.

The pair of upper and lower electrodes 11 and 11 is formed of a plate-shaped flexible electrode having a square shape in a plan view, and is connected to the force detection device 40 via a flexible electric wire (not illustrated). The pair of upper and lower electrodes 11 and 11 is disposed so as to entirely overlap each other in a plan view.

The upper and lower electrodes 11 and 11 may be composed of conductive elastomer, containing carbon or other conducting materials. One of the upper and lower electrodes 11 and 11 may be composed of copper, for example copper patterned on a printed circuit board. The upper and lower electrodes 11 and 11 may be composed of stretchable conducting fabric that can be cut using a blade, or a laser.

The upper electrode 11 is attached to the upper electrode substrate 10 in a state where a lower surface of the upper electrode 11 is flush with the lower surface of the upper electrode substrate 10, and the lower electrode 11 is attached to the lower electrode substrate 10 in a state where an upper surface of the lower electrode 11 is flush with the upper surface of the lower electrode substrate 10 (see FIG. 2). In the present embodiment, the upper electrode 11 corresponds to one of a first electrode and a second electrode, and the lower electrode 11 corresponds to the other of the first electrode and the second electrode.

Meanwhile, the base material 12 is disposed between the upper and lower electrodes 11 and 11, and has an upper end surface fixed to the upper electrode 11 and a lower end surface fixed to the lower electrode 11 and the lower electrode substrate 10. The base material 12 is provided such that the center of the base material 12 coincides with the centers of the upper and lower electrodes 11 and 11 in a plan view.

The base material 12 is made of a material (for example, silicone rubber) having dielectric properties and elasticity, and includes an upper base material layer portion 12*a* and a lower base material layer portion 12*b*. The upper base material layer portion 12*a* and the lower base material layer portion 12*b* are integrally molded. The base material 12 may be composed of elastomers including those based on poly (styrene-block-isobutylene-block-styrene), styrene-ethylene-butylene-styrene polymers, and other elastomers from the styrene-isobutadiene family, as well as polyurethane elastomers. The base material 12 may be composed of materials in the form of foams.

Note that the base material 12 may be configured by laminating the upper base material layer portion 12*a* and the lower base material layer portion 12*b*. A shape of a continuous portion between the upper base material layer portion 12*a* and the lower base material layer portion 12*b* may be a curved surface shape such as round chamfering. In the present embodiment, the upper base material layer portion 12*a* corresponds to one of a plurality of base material layers, and the lower base material layer portion 12*b* corresponds to another one of the plurality of base material layers.

The upper base material layer portion 12*a* is formed in a quadrangular frustum shape, and includes an upper end surface having a shape and size matching the lower surface of the upper electrode 11. The lower base material layer portion 12*b* has a quadrangular prism shape and extends downward from the lower end of the upper base material layer portion 12*a*, and the lower end surface thereof has a square size larger than the upper surface of the lower electrode 11.

With the above configuration, in the base material 12, the elastic deformation amount of the upper base material layer portion 12*a* and the elastic deformation amount of the lower base material layer portion 12*b* when a force acts on the base material 12 are different. This is because, in the electrostatic capacity sensor 1, a change in electrostatic capacity with respect to a force exhibits a characteristic (see FIG. 4) to be described later.

Meanwhile, the force detection device 40 is configured by combining a microcomputer and an electric circuit. In the force detection device 40, the electrostatic capacity C between the upper and lower electrodes 11 and 11 is detected by applying a voltage between the upper and lower electrodes 11 and 11, and a force (load) acting downward on the electrostatic capacity sensor 1 is calculated by an arithmetic expression (not illustrated) on the basis of the electrostatic capacity C.

Next, the operation and function of the electrostatic capacity sensor 1 of the present embodiment configured as described above will be described. First, in order to be compared with the electrostatic capacity sensor 1 of the present embodiment, an electrostatic capacity sensor 1X (hereinafter referred to as a "sensor 1X of a comparative example") of a comparative example illustrated in FIG. 5A will be described.

Figure 5A:
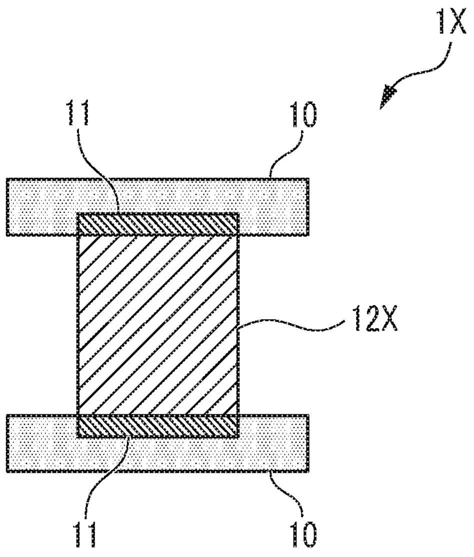
FIG. 5A is a view illustrating a state in which a force does not act on an electrostatic capacity sensor of a comparative example.

The sensor 1X of the comparative example is different from the electrostatic capacity sensor 1 only in that a base material 12X is provided instead of the base material 12 as illustrated in FIG. 5A, and thus the same components as those of the electrostatic capacity sensor 1 are denoted by the same reference numerals, and the description thereof will be omitted.

The base material 12X is made of the same material as the base material 12, has a quadrangular prism shape, extends between the upper and lower electrodes 11 and 11, and has upper and lower end surfaces in a square shape having the same size as the upper and lower electrodes 11 and 11.

Next, the operation and function of the sensor 1X of the comparative example will be described. In the following description, a change in electrostatic capacity C between the pair of upper and lower electrodes 11 and 11 will be described as an example.

In the sensor 1X of the comparative example, when a vertical load F (hereinafter simply referred to as a "load F") acts, the base material 12X is elastically deformed from the state illustrated in FIG. 5A. Due to the elastic deformation of the base material 12X, the distance between the upper and lower electrodes 11 and 11 decreases, and accordingly, the electrostatic capacity C between the electrodes 11 and 11 changes as shown in a characteristic curve in FIG. 6.

Figure 5B:
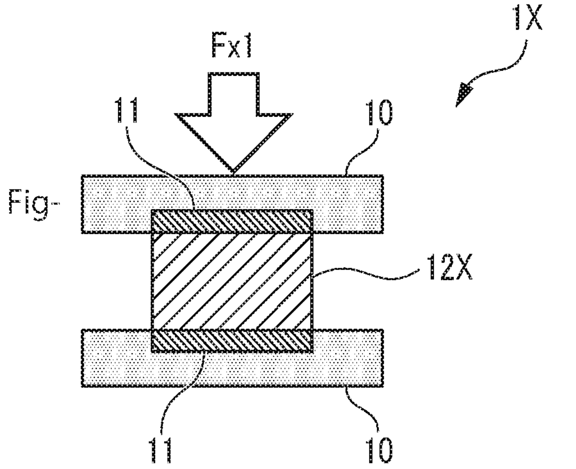
FIG. 5B is a view illustrating a state in which a force acts on the electrostatic capacity sensor of the comparative example.

For example, as illustrated in FIG. 5B, when a predetermined load Fx1 acts on the sensor 1X of the comparative example from above, the base material 12X is elastically deformed to the state illustrated in FIG. 5B. Accordingly, the electrostatic capacity C between the electrodes 11 and 11 increases as illustrated in FIG. 6.

Figure 6:
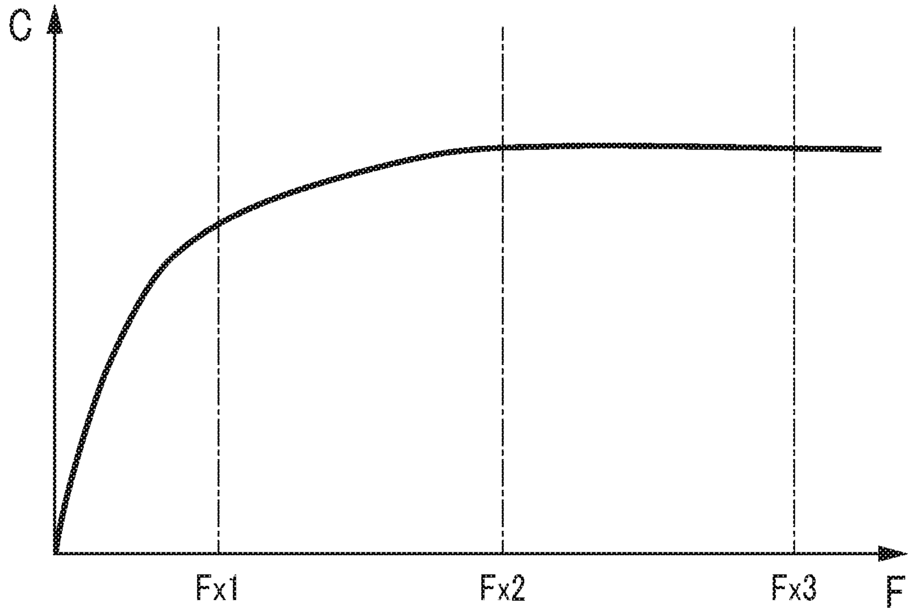
FIG. 6 is a diagram illustrating a characteristic curve of force-electrostatic capacity in an electrostatic capacity sensor of a comparative example.

Furthermore, when a load F larger than the predetermined load Fx1 acts on the sensor 1X of the comparative example from above, the elastic deformation amount of the base material 12X increases, and accordingly, the electrostatic capacity C between the electrodes 11 and 11 rises as illustrated in FIG. 6.

Figure 5C:
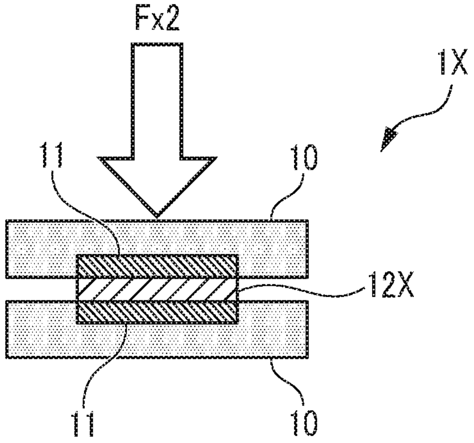
FIG. 5C is a view illustrating a state in which a force larger than that in FIG. 5B acts on the electrostatic capacity sensor of the comparative example.

Then, when a predetermined load Fx2 larger than the predetermined load Fx1 acts on the sensor 1X of the comparative example from above, the base material 12X is elastically deformed to a limit deformation state illustrated in FIG. 5C. The limit deformation state illustrated in FIG. 5C corresponds to a state in which the base material 12X cannot be elastically deformed any more.

Figure 5D:
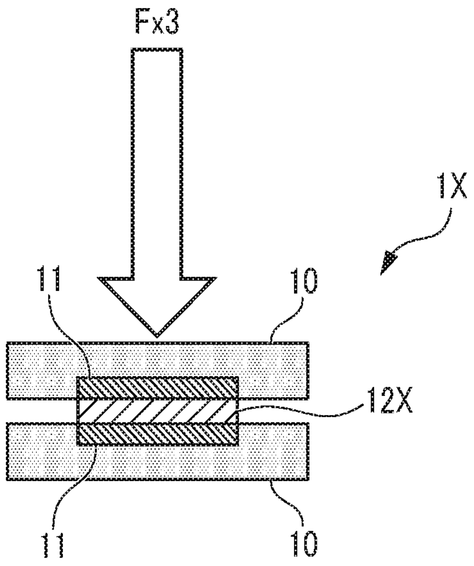
FIG. 5D is a view illustrating a state in which a force larger than that in FIG. 5C acts on the electrostatic capacity sensor of the comparative example.

Accordingly, for example, as illustrated in FIG. 5D, when a predetermined load Fx3 larger than the predetermined load Fx2 acts on the sensor 1X of the comparative example from above, the elastic deformation amount of the base material 12X does not change. As a result, as illustrated in FIG. 6, the electrostatic capacity C between the electrodes 11 and 11 does not change in the region of the predetermined load Fx2 or more. Therefore, in the case of the sensor 1X of the comparative example, the detectable region of the load F is $0 \leq F \leq Fx2$.

Figure 3A:
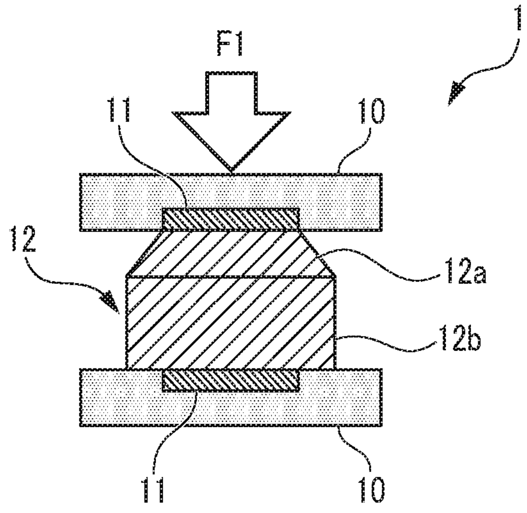
FIG. 3A is a view illustrating a state in which a force acts on an electrostatic capacity sensor.

Meanwhile, in the case of the electrostatic capacity sensor 1 of the present embodiment (hereinafter referred to as a "sensor 1 of the present invention"), for example, as shown in FIG. 3A, when a predetermined load F1 acts on the sensor 1 of the present invention from above, the lower base material layer portion 12*b* of the base material 12 is hardly elastically deformed, and only the upper base material layer portion 12*a* is elastically deformed to the state shown in FIG. 3A. Accordingly, the electrostatic capacity C between the electrodes 11 and 11 rises as indicated by a characteristic curve indicated by a solid line in FIG. 4.

In addition, when a load F larger than the predetermined load F1 acts on the sensor 1 of the present invention from above, the lower base material layer portion 12*b* of the base material 12 hardly elastically deforms, and the elastic deformation amount of the upper base material layer portion 12*a* increases. Accordingly, the electrostatic capacity C between the electrodes 11 and 11 rises as indicated by a characteristic curve indicated by a solid line in FIG. 4.

Figure 3B:
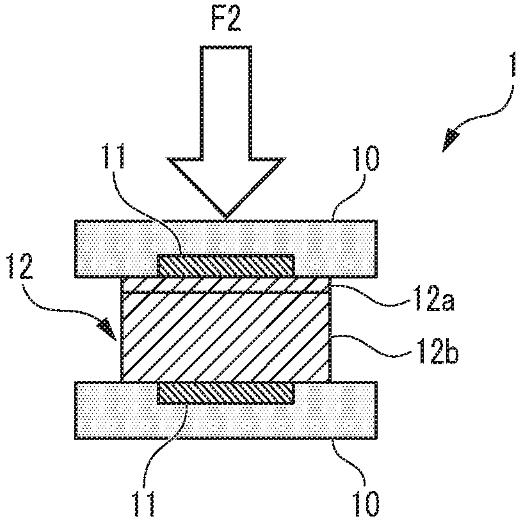
FIG. 3B is a view illustrating a state in which a force larger than that in FIG. 3A acts on the electrostatic capacity sensor.

Then, as shown in FIG. 3B, when a predetermined load F2 larger than the predetermined load F1 acts on the sensor 1 of the present invention from above, the lower base material layer portion 12*b* of the base material 12 is hardly elastically deformed, and only the upper base material layer portion 12*a* is in a limit deformation state shown in FIG. 3B.

As a result, when a load F larger than the predetermined load F2 acts on the sensor 1 of the present invention from above, the upper base material layer portion 12*a* of the base material 12 hardly elastically deforms, and the elastic deformation amount of the lower base material layer portion 12*b* increases. Accordingly, in a region of $F \geq F2$, the electrostatic capacity C between the electrodes 11 and 11 rises as indicated by a characteristic curve indicated by a solid line in FIG. 4. That is, in the case of the sensor of the present invention, after the upper base material layer portion 12*a* is elastically deformed to the limit deformation state, the lower base material layer portion 12*b* is elastically deformed, whereby the electrostatic capacity C between the electrodes 11 and 11 changes in two stages.

When a predetermined load F3 larger than the predetermined load F2 acts on the sensor 1 of the present invention from above, the lower base material layer portion 12*b* of the base material 12 is also in the limit deformation state. As a result, when the load F larger than the predetermined load F3 acts on the sensor 1 of the present invention from above, the elastic deformation amount of the base material 12 does not change. As a result, as indicated by a solid line in FIG. 4, the electrostatic capacity C between the electrodes 11 and 11 does not change in the region of the predetermined load F3 or more. That is, the detectable region of the load F in the sensor 1 of the present invention is 0≤F≤F3.

Figure 4:
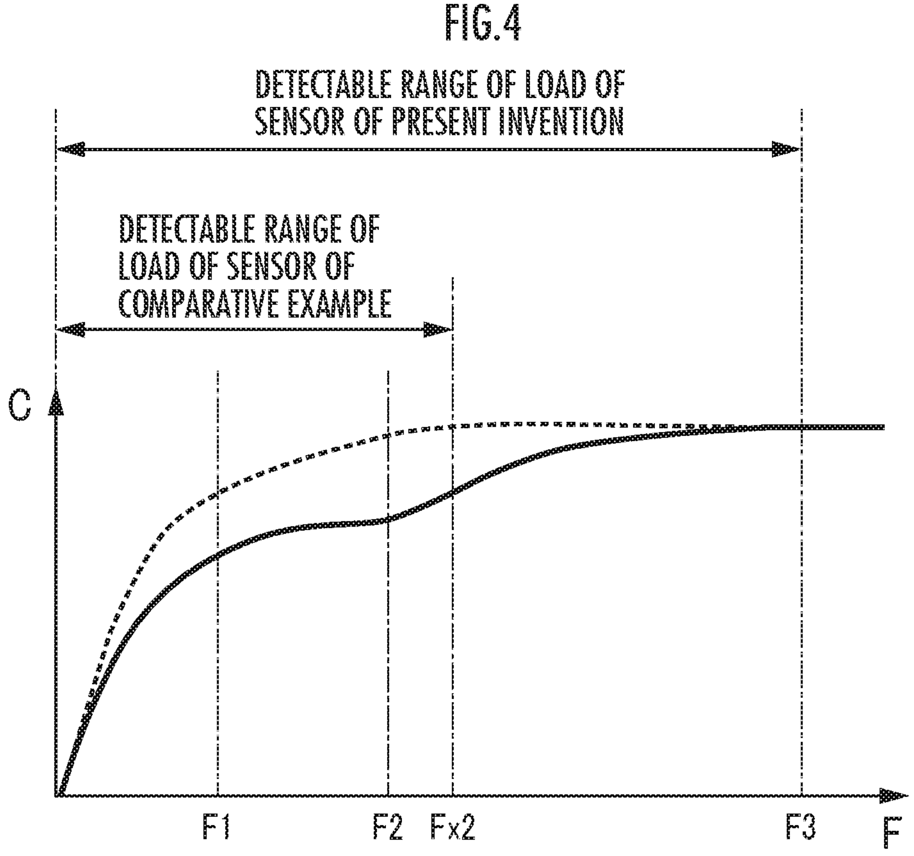
FIG. 4 is a diagram illustrating a characteristic curve of force-electrostatic capacity in the electrostatic capacity sensor according to the first embodiment.

In this case, a curve indicated by a broken line in FIG. 4 indicates a change in the electrostatic capacity C with respect to the load F of the sensor 1X of the comparative example, and the predetermined load F3 has a value satisfying F3>Fx2. That is, while the detectable region of the load F is 0≤F≤Fx2 in the case of the sensor 1X of the comparative example, the detectable region of the load F is a wider region 0≤F≤F3 in the case of the sensor 1 of the present invention, and it can be seen that the detectable region of the load F can be enlarged as compared with the sensor 1X of the comparative example.

As described above, according to the electrostatic capacity sensor 1 of the present embodiment, when the load F (force) acts, the base material 12 is elastically deformed so that an interval between the upper and lower electrodes 11 and 11 decreases. In this case, the upper base material layer portion 12*a* of the base material 12 is elastically deformed such that the electrostatic capacity C changes with respect to the load F in the range of 0≤F≤F2, and the lower base material layer portion 12*b* is elastically deformed such that the electrostatic capacity C changes with respect to the load F in the range of F2≤F≤F3. As a result, the detectable range of the load F in the electrostatic capacity sensor 1 is 0≤F≤F3, so that the detectable range can be expanded as compared with the sensor 1X of the comparative example including the single layer of the base material 12X.

In addition, since the upper and lower electrodes 11 and 11 are provided on the upper and lower electrode substrates 10 and 10 having dielectric properties and elasticity, it is possible to detect the load F acting on the electrostatic capacity sensor 1 from both the upper and lower sides.

When the arrangement and shape of the upper and lower electrodes 11 and 11 in the electrostatic capacity sensor 1 of the present embodiment are changed to detect a shearing force, the base material 12 having the shape illustrated in FIG. 2 has a wider detectable region of the shearing force than the base material 12X having the shape illustrated in FIG. 5A, which is advantageous in terms of detection sensitivity.

Further, the first embodiment is an example in which the upper and lower electrodes 11 and 11 having a square shape in a plan view are used, but the shape in a plan view of the upper and lower electrodes 11 and 11 may be a polygon or a circle other than a square.

In addition, the first embodiment is an example of using the base material 12 having the upper base material layer portion 12*a* having a quadrangular pyramid shape and the lower base material layer portion 12*b* having a quadrangular prism shape, but the shape of the base material 12 is not limited thereto, and may be any shape as long as the elastic deformation amount of the upper base material layer portion 12*a* and the lower base material layer portion 12*b* is different when the same force is applied, so that a characteristic curve as shown in FIG. 4 can be obtained. For example, the base material 12 may be configured such that the upper base material layer portion 12*a* has a truncated pyramid shape of a pentagon or more, and the lower base material layer portion 12*b* has a prismatic shape of a pentagon or more. The base material 12 may be configured such that the upper base material layer portion 12*a* has a truncated cone shape and the lower base material layer portion 12*b* has a columnar shape.

Furthermore, in the base material 12, a region of a load in which the upper base material layer portion 12*a* is elastically deformed and a region of a load in which the lower base material layer portion 12*b* is elastically deformed may be configured such that both regions partially overlap each other.

Further, the first embodiment is an example in which the base material 12 has a two-layer structure of the upper base material layer portion 12*a* and the lower base material layer portion 12*b*, but instead of this, the base material 12 may be configured to include three or more base material layers.

Figure 7:
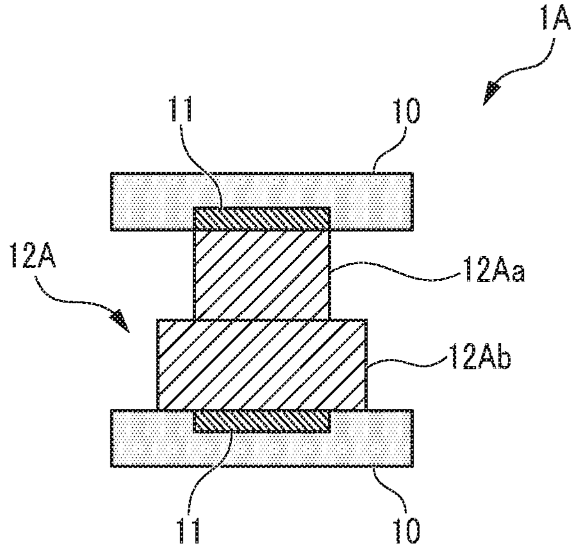
FIG. 7 is a view illustrating a modification of the electrostatic capacity sensor.
Figure 8:
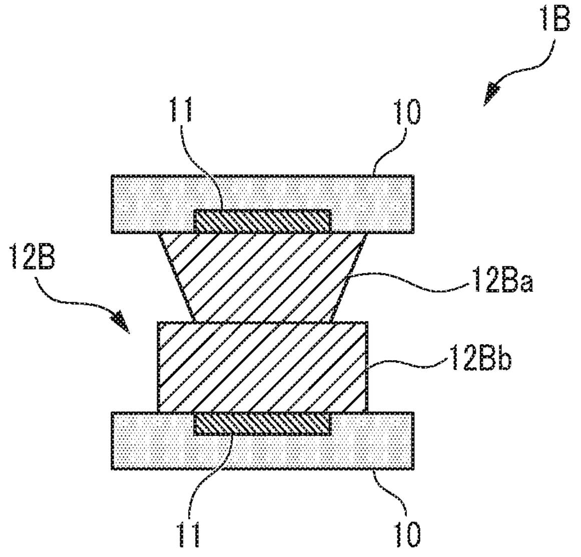
FIG. 8 is a view illustrating a modification of the electrostatic capacity sensor.
Figure 9:
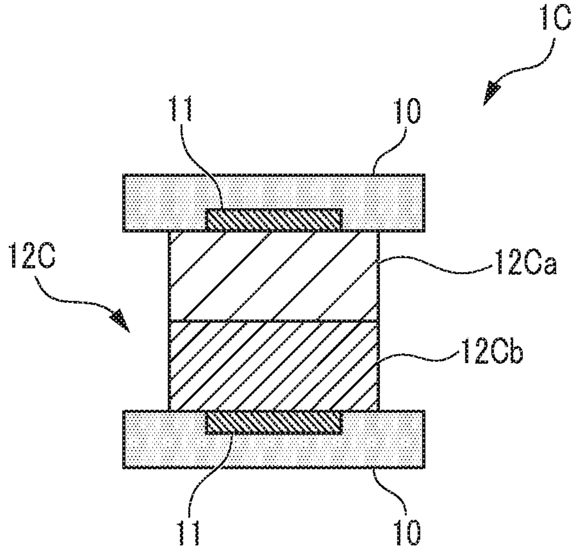
FIG. 9 is a view illustrating a modification of the electrostatic capacity sensor.

Meanwhile, instead of the electrostatic capacity sensor 1 of the first embodiment, the electrostatic capacity sensor of the present invention may be configured as electrostatic capacity sensors 1A to 1C illustrated in FIGS. 7 to 9. Note that the following electrostatic capacity sensors 1A to 1C are different from the electrostatic capacity sensor 1 only in that the electrostatic capacity sensors 1A to 1C include base materials 12A to 12C instead of the base material 12, and thus, the base materials 12A to 12C will be mainly described below.

As illustrated in FIG. 7, the base material 12A of the electrostatic capacity sensor 1A includes an upper base material layer portion 12Aa and a lower base material layer portion 12Ab. The upper base material layer portion 12Aa and the lower base material layer portion 12Ab are made of the same material as the base material 12, and are integrally molded in a concentric state.

The upper base material layer portion 12Aa has a quadrangular prism shape, and is formed in a square shape having the same size as the upper electrode 11 in a plan view. The lower base material layer portion 12Ab also has a quadrangular prism shape, and is formed in a square shape having a size larger than that of the upper base material layer portion 12*a* in a plan view.

According to the electrostatic capacity sensor 1A configured as described above, when a load acts, the upper base material layer portion 12Aa and the lower base material layer portion 12Ab are elastically deformed similarly to the upper base material layer portion 12*a* and the lower base material layer portion 12*b* of the base material 12 described above. As a result, the relationship between the load and the electrostatic capacity in the electrostatic capacity sensor 1A has the same tendency as the characteristic curve in FIG. 4 described above. That is, the electrostatic capacity sensor 1A can also obtain the same effects as those of the electrostatic capacity sensor 1 of the first embodiment.

As illustrated in FIG. 8, the base material 12B of the electrostatic capacity sensor 1B includes an upper base material layer portion 12Ba and a lower base material layer portion 12Bb. The upper base material layer portion 12Ba and the lower base material layer portion 12Bb are made of the same material as the base material 12, and are integrally molded.

The upper base material layer portion 12Ba has a shape and size in which the upper and lower portions of the upper base material layer portion 12*a* of the base material 12 are inverted, and the lower base material layer portion 12Bb has the same shape and size as the lower base material layer portion 12*b* of the base material 12.

According to the electrostatic capacity sensor 1B configured as described above, when a load acts, the upper base material layer portion 12Ba and the lower base material layer portion 12Bb are elastically deformed similarly to the upper base material layer portion 12*a* and the lower base material layer portion 12*b* of the base material 12 described above. As a result, the relationship between the load and the electrostatic capacity in the electrostatic capacity sensor 1B has the same tendency as the characteristic curve in FIG. 4 described above. That is, the electrostatic capacity sensor 1B can also obtain the same effects as those of the electrostatic capacity sensor 1 of the first embodiment.

As illustrated in FIG. 9, the base material 12C of the electrostatic capacity sensor 1C includes an upper base material layer portion 12Ca and a lower base material layer portion 12Cb.

Each of the upper base material layer portion 12Ca and the lower base material layer portion 12Cb is formed in a quadrangular prism shape having the same size, and is made of a material (for example, silicone rubber) having dielectric properties and elasticity. The upper base material layer portion 12Ca has an elastic coefficient smaller than that of the lower base material layer portion 12Cb.

Figure 3C:
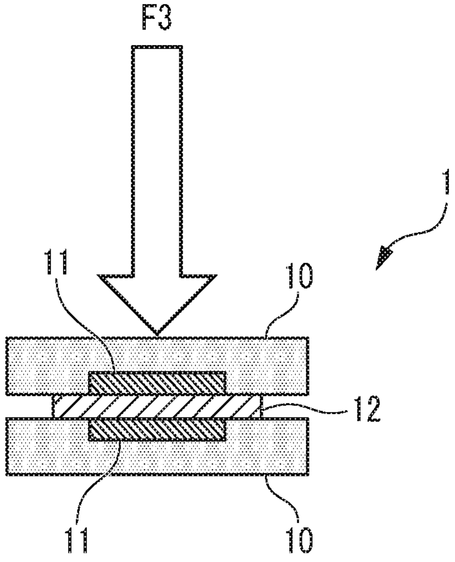
FIG. 3C is a view illustrating a state in which a force larger than that in FIG. 3B acts on the electrostatic capacity sensor.

More specifically, the elastic coefficients of the upper base material layer portion 12Ca and the lower base material layer portion 12Cb are configured to be in the same elastic deformation state shown in FIG. 3A to FIG. 3C as the upper base material layer portion 12*a* and the lower base material layer portion 12*b* of the base material 12 described above when a load acts on the electrostatic capacity sensor 1C.

As a result, the relationship between the load and the electrostatic capacity in the electrostatic capacity sensor 1C when the load acts tends to be similar to the characteristic curve in FIG. 4 described above. That is, the electrostatic capacity sensor 1C can also obtain the same effects as those of the electrostatic capacity sensor 1 of the first embodiment.

Note that the upper base material layer portion 12Ca and the lower base material layer portion 12Cb may be composed of porous (as in a foam) material. In the case where the base material 12C is not columnar or the base material 12C is not porous (as in a foam) material, the base material 12C may be composed of a material having a Poisson's ratio significantly different from 0.5.

Figure 10:
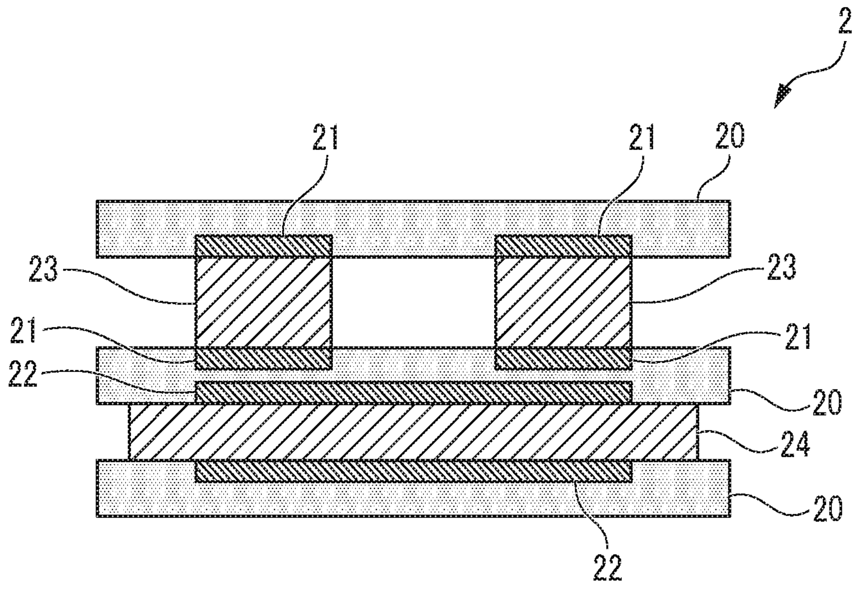
FIG. 10 is a cross-sectional view illustrating a configuration of an electrostatic capacity sensor according to a second embodiment.

Next, an electrostatic capacity sensor according to a second embodiment of the present invention will be described. As illustrated in FIG. 10, an electrostatic capacity sensor 2 of the present embodiment includes three upper, middle, and lower electrode substrates 20, 20, and 20, a plurality of sets (only two sets are illustrated in FIG. 10) of first electrodes 21 and 21 each including a pair of upper and lower first electrodes 21 and 21 as one set, a plurality of (only two sets are illustrated in FIG. 10) of first base materials 23, a plurality of sets (only one set is illustrated in FIG. 10) of second electrodes 22 and 22 each including a pair of upper and lower second electrodes 22 and 22 as one set, and a plurality of (only one is illustrated in FIG. 10) of second base materials 24.

Each of the upper, middle, and lower electrode substrates 20, 20, and 20 has a plate shape, and is made of a material (for example, silicone rubber) having dielectric properties and elasticity (or flexibility). In the present embodiment, the middle electrode substrate 20 corresponds to a common electrode substrate, and the upper and lower electrode substrates 20 and 20 correspond to other electrode substrates.

The upper and lower first electrodes 21 and 21 are plate-shaped flexible electrodes of a square shape (not illustrated) in a plan view, and are connected to a force detection device (not illustrated) similar to the force detection device 40 via a flexible electric wire (not illustrated). The upper and lower first electrodes 21 and 21 are disposed so as to entirely overlap each other in a plan view.

The upper first electrode 21 is attached to the upper electrode substrate 20 in a state where a lower surface thereof is flush with the lower surface of the upper electrode substrate 20. The lower first electrode 21 is attached to the middle electrode substrate 20 in a state where an upper surface thereof is flush with the upper surface of the middle electrode substrate 20.

Meanwhile, the first base material 23 is made of the same material as the base material 12 described above, and has a quadrangular prism shape and extends between the upper and lower first electrodes 21 and 21. The first base material 23 has upper and lower end surfaces in a square shape having the same size as the upper and lower first electrodes 21 and 21, and is disposed so as to entirely overlap the upper and lower first electrodes 21 and 21 in a plan view.

The upper and lower second electrodes 22 and 22 are formed of plate-shaped flexible electrodes each having a rectangular shape (not illustrated) in a plan view, and are connected to a force detection device (not illustrated) similar to the force detection device via a flexible electric wire (not illustrated). The upper and lower second electrodes 22, 22 are disposed so as to entirely overlap each other in a plan view.

The upper second electrode 22 is attached to the middle electrode substrate 20 in a state where a lower surface thereof is flush with the lower surface of the middle electrode substrate 20 and there is an interval in a vertical direction between the upper second electrode 22 and the lower first electrode 21. The lower second electrode 22 is attached to the lower electrode substrate 20 in a state where an upper surface thereof is flush with the upper surface of the lower electrode substrate 20.

Meanwhile, the second base material 24 is made of the same material as the base material 12 described above, and has a quadrangular prism shape and extends between the upper and lower second electrodes 22 and 22. The second base material 24 has upper and lower end surfaces in a rectangular shape larger in size than the upper and lower second electrodes 22 and 22, and is disposed so as to cover the entire upper and lower second electrodes 22 and 22 in a plan view.

In addition, the second base material 24 has a larger plane area than the first base material 23, whereby the second base material 24 is configured to have a smaller elastic deformation amount than the first base material 23 in a region where the load F is small. That is, the first base material 23 and the second base material 24 are configured to have different elastic deformation amounts with respect to the same load F.

Figure 11:
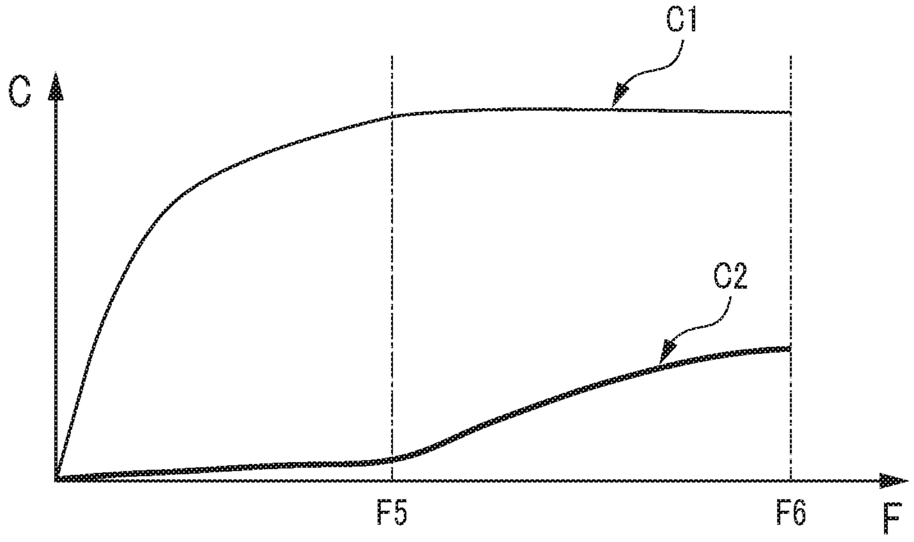
FIG. 11 is a diagram illustrating a characteristic curve of force-electrostatic capacity in the electrostatic capacity sensor according to the second embodiment.

According to the electrostatic capacity sensor 2 of the present embodiment configured as described above, when the load F acts, the first base material 23 and the second base material 24 are elastically deformed, so that electrostatic capacity C1 (hereinafter referred to as "first electrostatic capacity C1") between the upper and lower first electrodes 21 and 21 and electrostatic capacity (hereinafter referred to as "second electrostatic capacity C2") between the upper and lower second electrodes 22 and 22 change as illustrated in FIG. 11.

That is, the first electrostatic capacity C1 rapidly increases as the load F increases in a region where the load F is between a value 0 and a predetermined load F5, and hardly changes in a region of F5≤F. This is because when the predetermined load F5 acts on the electrostatic capacity sensor 2, the first base material 23 hardly changes in the region of F5≤F as the first base material 23 is in the limit deformation state.

Meanwhile, in the region of 0≤F≤F5, as the load F increases, the second electrostatic capacity C2 gradually increases as compared with the curve of the first electrostatic capacity C1, and in the region of F5≤F≤F6, the second electrostatic capacity C2 changes with a gradient larger than that in the region of 0≤F≤F5. The predetermined load F6 is a predetermined value of the load F larger than the predetermined load F5. Although not illustrated, the second electrostatic capacity C2 hardly changes in the region of F6<F.

As described above, according to the electrostatic capacity sensor 2 of the present embodiment, the load F can be detected in the region of 0≤F≤F6 based on the values of the first electrostatic capacity C1 and the second electrostatic capacity C2, and the detectable region of the load F can be enlarged. In addition, by changing the shapes and materials of the first base material 23 and the second base material 24, it is possible to freely set a change state and a change region of the first electrostatic capacity C1 and the second electrostatic capacity C2 when the same force (load F) is applied. For the same reason, the degree of freedom in arrangement of the pair of first electrodes 21 and 21 and the pair of second electrodes 22 and 22 can be improved. As a result, the degree of freedom in designing the electrostatic capacity sensor 2 can be improved.

Furthermore, in the case of the electrostatic capacity sensor 2, since the lower first electrode 21 and the upper second electrode 22 are provided on the same middle electrode substrate 20, the manufacturing cost can be reduced as compared with the case where the lower first electrode 21 and the upper second electrode 22 are provided on separate electrode substrates.

Note that the electrostatic capacity sensor 2 of the second embodiment is an example configured to detect two electrostatic capacities C1 and C2 by a detection unit (the pair of upper and lower first electrodes 21 and 21 and the first base material 23, the pair of upper and lower second electrodes 22 and 22 and the second base material 24;) having a two-layer structure, but may be configured to be able to detect three or more electrostatic capacities by adding one or more detection units (another pair of electrodes and another base material).

Figure 12:
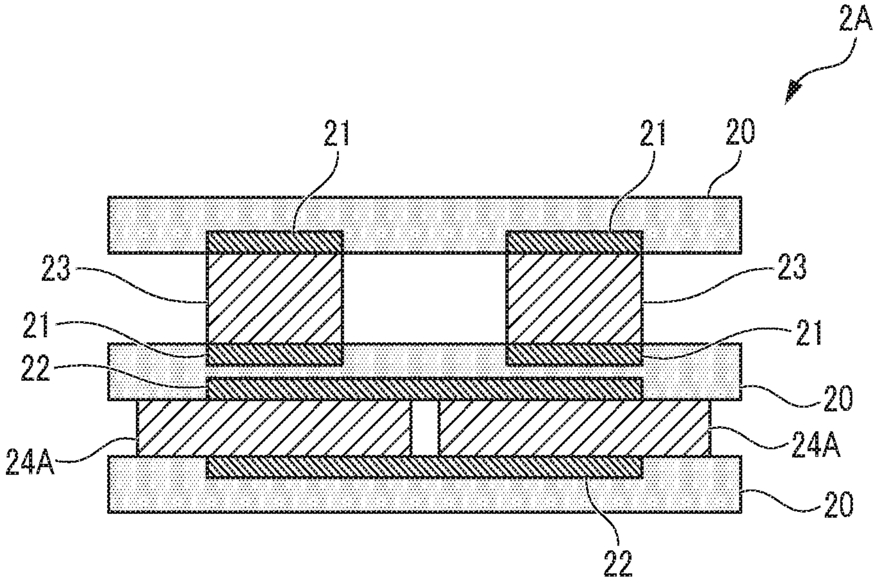
FIG. 12 is a view illustrating a modification of the electrostatic capacity sensor of the second embodiment.

Further, instead of the electrostatic capacity sensor 2 of the second embodiment, the electrostatic capacity sensor of the present invention may be configured as an electrostatic capacity sensor 2A illustrated in FIG. 12. Note that, in the case of the electrostatic capacity sensor 2A, as is clear from comparison between FIG. 10 and FIG. 12, the electrostatic capacity sensor 2A is different only in that two second base materials 24A and 24A are provided instead of the second base material 24, and thus, the second base materials 24A and 24A will be mainly described below.

As illustrated in FIG. 12, the second base materials 24A and 24A of the electrostatic capacity sensor 2A are made of the same material as the base material 12, and are formed in a quadrangular prism shape having a rectangular shape (not illustrated) in a plan view. The second base materials 24A and 24A are arranged with a small interval therebetween, and are configured such that the plane area is smaller than that of the second base material 24 by the interval.

According to the electrostatic capacity sensor 2A configured as described above, when a load acts, the second base materials 24A and 24A are elastically deformed substantially in the same manner as the second base material 24 described above. As a result, the relationship between the load F and the second electrostatic capacity C2 in the electrostatic capacity sensor 2A tends to be similar to the characteristic curve in FIG. 11 described above. That is, the electrostatic capacity sensor 2A can also obtain the same effects as those of the electrostatic capacity sensor 2 of the second embodiment.

Figure 13:
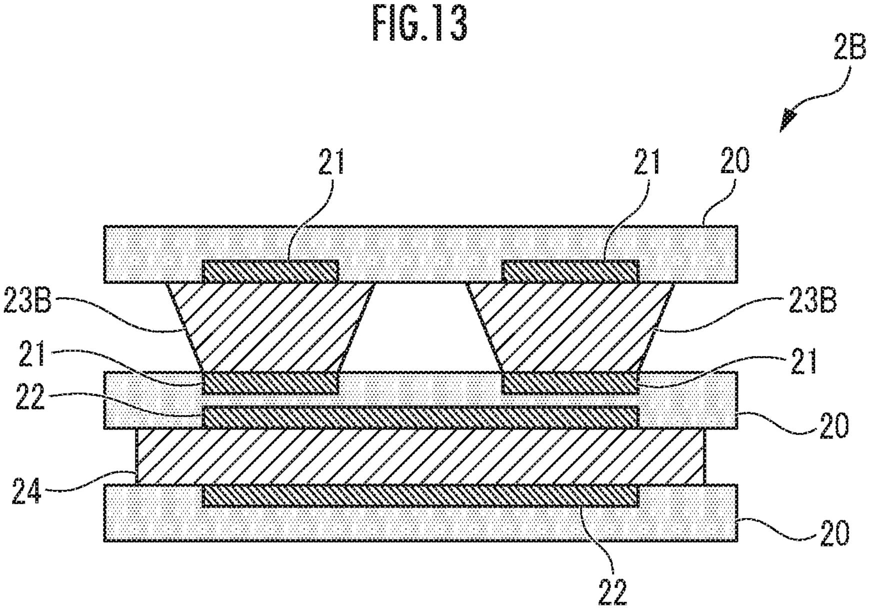
FIG. 13 is a view illustrating a modification of the electrostatic capacity sensor of the second embodiment.

Further, instead of the electrostatic capacity sensor 2 of the second embodiment, the electrostatic capacity sensor of the present invention may be configured as an electrostatic capacity sensor 2B illustrated in FIG. 13. Note that, in the case of the electrostatic capacity sensor 2B, as is clear from comparison between FIGS. 10 and 13, the electrostatic capacity sensor 2B is different only in that the electrostatic capacity sensor 2B includes a first base material 23B instead of the first base material 23, and thus, the first base material 23B will be mainly described below.

In the case of the electrostatic capacity sensor 2B, the first base material 23B is made of the same material as the base material 12, and has a shape in which the upper and lower sides of a quadrangular pyramid are reversed, similarly to the upper base material layer portion 12Ba of the base material 12B described above.

According to the electrostatic capacity sensor 2B configured as described above, when a load acts, the first base material 23B is elastically deformed with substantially the same tendency as the first base material 23 described above. As a result, the relationship between the load F and the first electrostatic capacity C1 in the electrostatic capacity sensor 2B has the same tendency as the characteristic curve in FIG. 11 described above. That is, the electrostatic capacity sensor 2B can also obtain the same effects as those of the electrostatic capacity sensor 2 of the second embodiment.

REFERENCE SIGNS LIST

- 1 electrostatic capacity sensor
- 10 electrode substrate
- 11 upper electrode (one of first electrode and second electrode)
- 11 lower electrode (the other of first electrode and second electrode)
- 12 base material
- 12*a* upper base material layer portion (one of plurality of base material layers)
- 12*b* lower base material layer portion (another one of plurality of base material layers)
- C electrostatic capacity
- 2 electrostatic capacity sensor
- 20 upper electrode substrate (another electrode substrate)
- 20 middle electrode substrate (common electrode substrate)
- 20 lower electrode substrate (another electrode substrate)
- 21 first electrode
- 22 second electrode
- 23 first base material
- 24 second base material

What is claimed is:

1. An electrostatic capacity sensor comprising:

a first electrode;

a second electrode disposed to face the first electrode and configured to detect electrostatic capacity between the second electrode and the first electrode; and a plurality of base materials having dielectric properties and elasticity and each disposed between the first electrode and the second electrode in a state of being in contact with the first electrode and the second electrode, and arranged with intervals therebetween, wherein each of the base materials include a plurality of base material layers provided to be arranged in a facing direction of the first electrode and the second electrode, the plurality of base material layers are continuous such that at least a boundary between a first base material and a second base material extends parallel to the electrodes, the first base material and the second base material have different shapes from each other, and a plurality of the first base materials and a plurality of the second base materials are individually provided, an upper end surface of the first base material in contact with the first electrode is larger than a lower end surface of the first base material, the second base material has a lower end surface in contact with the second electrode which is of same size with an upper end surface of the second base material, the lower end surface of the first base material is in contact with the upper end surface of the second base material, and the other end surface of the first base material is smaller than the other end surface of the second base material;

the plurality of base material layers are configured such that elastic deformation amounts when same force is applied are different from each other, the upper end surface of the first base material in contact with the first electrode is larger than a lower end surface of the first electrode, and a lower end surface of the first base material has a same size as the lower end surface of the first electrode, and the lower end surface of the second base material in contact with the second electrode is larger than an upper end surface of the second electrode.

2. The electrostatic capacity sensor according to claim 1, wherein each of the first electrode and the second electrode is provided on an electrode substrate having dielectric properties and elasticity.

3. The electrostatic capacity sensor according to claim 1, wherein the first base material and the second base material are formed such that a maximum width and a minimum width of the first base material are different, and a maximum width and a minimum width of the second base material are identical, in a side view.

* * * * *